US009057908B2

(12) United States Patent
Liu et al.

(10) Patent No.: US 9,057,908 B2
(45) Date of Patent: Jun. 16, 2015

(54) COLOR FILTER SUBSTRATE

(75) Inventors: Chih-Chung Liu, Guangdong (CN);
Meng-Chieh Tai, Guangdong (CN);
Ming-Tsung Wang, Guangdong (CN);
De-Jiun Li, Guangdong (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 12 days.

(21) Appl. No.: 13/371,484

(22) Filed: Feb. 13, 2012

(65) Prior Publication Data
US 2013/0155537 A1   Jun. 20, 2013

(30) Foreign Application Priority Data

Dec. 20, 2011   (CN) ............................ 2011 1 0430303

(51) Int. Cl.
*G02B 5/22* (2006.01)
*G02F 1/133* (2006.01)
*G02F 1/1335* (2006.01)
*G02B 5/20* (2006.01)
*G02F 1/1333* (2006.01)

(52) U.S. Cl.
CPC ...... *G02F 1/133514* (2013.01); *G02F 2201/52* (2013.01); *G02B 5/201* (2013.01); *G02F 2001/133388* (2013.01)

(58) Field of Classification Search
CPC .......... G02B 26/007–26/008; G02F 1/133509; G02F 1/133512; G02F 1/133514
USPC ................................................. 359/891, 889
See application file for complete search history.

(56) References Cited

U.S. PATENT DOCUMENTS

| 2005/0174043 | A1* | 8/2005 | Kiguchi et al. | 313/503 |
| 2008/0068541 | A1* | 3/2008 | Sun et al. | 349/106 |
| 2008/0278665 | A1* | 11/2008 | Uemoto | 349/106 |
| 2009/0011567 | A1* | 1/2009 | Li et al. | 438/401 |
| 2009/0073357 | A1* | 3/2009 | Takahashi et al. | 349/106 |
| 2010/0165271 | A1* | 7/2010 | Tsubata | 349/106 |
| 2011/0221989 | A1* | 9/2011 | Lee et al. | 349/41 |

FOREIGN PATENT DOCUMENTS

TW          M330484          4/2008

* cited by examiner

*Primary Examiner* — Thomas K Pham
*Assistant Examiner* — Marin Pichler
(74) *Attorney, Agent, or Firm* — Novak Druce Connolly Bove + Quigg LLP

(57) ABSTRACT

A color filter substrate includes a transparent substrate, a patterned light-shielding layer, a plurality of color filter units, and a plurality of dummy color filter units. The transparent substrate has a display region and a peripheral region surrounding the display region. The patterned light-shielding layer is disposed on the transparent substrate, and the patterned light-shielding layer includes a first light-shielding pattern disposed on the display region and a second light-shielding pattern disposed on the peripheral region. The first light-shielding pattern defines a plurality of sub-pixel regions. The color filter units are disposed on the display region. The dummy color filter units are disposed on the peripheral region. Spacing between two adjacent dummy color filter units or spacing between the color filter unit and the adjacent dummy color filter unit is wider than spacing between two adjacent color filter units.

11 Claims, 17 Drawing Sheets

COLOR FILTER SUBSTRATE

BACKGROUND OF THE INVENTION

1. Field of the Invention

The present invention relates to a color filter substrate, and more particularly, to a color filter substrate with wider spacing between dummy color filter units or wider spacing between a color filter unit and the dummy color filter unit.

2. Description of the Prior Art

Electronics, such as televisions, cell phones, mobiles, and refrigerators, often include flat display panels. The liquid crystal display (LCD) panel has become the mainstream flat display panel because of its great display performance and low cost. Generally, the LCD panel includes an array substrate, a color filter substrate, and a liquid crystal layer sandwiched in-between the two substrates. The array substrate includes a plurality of array pixel units for driving liquid crystal molecules in the liquid crystal layer. The color filter substrate includes a plurality of color filter units for displaying different colors.

Please refer to FIGS. 1-2. FIGS. 1-2 are schematic diagrams partially illustrating the color filter substrate according to a prior art. FIG. 1 is a top-view diagram, and FIG. 2 is a cross-sectional view diagram taken along a cross-sectional line P-P' in FIG. 1. As shown in FIGS. 1-2, a color filter substrate 900 includes a substrate 90, a patterned light-shielding layer 91, a plurality of color filter units 92, a plurality of dummy color filter units 93, an over-coating layer 94, and an alignment layer 95. The substrate 90 has a display region AA and a peripheral region DA. The peripheral region DA surrounds the display region AA. The patterned light-shielding layer 91 is disposed on the substrate 90. The patterned light-shielding layer 91 includes a first light-shielding pattern 91A disposed on the display region AA and a second light-shielding pattern 91B disposed on the peripheral region DA. The first light-shielding pattern 91A defines a plurality of sub-pixel regions PX. The color filter units 92 are disposed on the display region AA, and each of the color filter units 92 is disposed correspondingly to each of the sub-pixel regions PX and partially overlaps the first light-shielding pattern 91A. The dummy color filter units 93 are disposed on the peripheral region DA, and the second light-shielding pattern 91B is disposed under the dummy color filter units 93 on the peripheral region DA. The dummy color filter units 93 and the color filter units 92 are formed by the same manufacturing process. The dummy color filter units 93 are employed for improving the display quality around a border between the display region AA and the peripheral region DA. In addition, in order to improve the display quality by inhibiting the phenomenon of light leakage, the second light-shielding pattern 91B has to be large enough to completely block each of the dummy color filter units 93 as viewed in a direction Z normal to the substrate 90. After forming the color filter units 92 and the dummy color filter units 93, the over-coating layer 94 and the alignment layer 95 are sequentially formed to cover the substrate 90, the patterned light-shielding layer 91, the color filter units 92, and the dummy color filter units 93.

Generally, in consideration of production cost and process simplification, the color filter units 92 and the dummy color filter units 93 are formed by using an identical photomask. Therefore, a width W93 of each of the dummy color filter units 93 is equal to a width W92 of each of the color filter units 92, and spacing P93 between two adjacent dummy color filter units 93 is equal to spacing P92 between two adjacent color filter units 92, in addition, a thickness H93 of each of the dummy color filter units 93 is equal to a thickness H92 of each of the color filter units 92. Because the second light-shielding pattern 91B completely blocks each of the dummy color filter units 93 on the peripheral region DA and the over-coating layer 94 is not thick enough, a difference D9 in height between the over-coating layer 94 on the peripheral region DA and the over-coating layer 94 on the display region AA may be significant. A subsequent rubbing process on the alignment layer 95 may be seriously affected by the difference D9 in height around the border between the display region AA and the peripheral region DA, and defects such as light leakage may therefore occur.

SUMMARY OF THE INVENTION

It is one of the objectives of the present invention to provide a color filter substrate. Spacing between two adjacent dummy color filter units or spacing between a color filter unit and the dummy color filter unit is designed to be wider than spacing between two adjacent color filter units for reducing the difference in height around the border between the display region and the peripheral region of the color filter substrate.

According to the present invention, a color filter substrate includes a transparent substrate, a patterned light-shielding layer, a plurality of color filter units, and a plurality of dummy color filter units. The transparent substrate has a display region and a peripheral region, and the peripheral region surrounds the display region. The patterned light-shielding layer is disposed on the transparent substrate, and the patterned light-shielding layer includes a first light-shielding pattern disposed on the display region and a second light-shielding pattern disposed on the peripheral region. The first light-shielding pattern defines a plurality of sub-pixel regions. The color filter units are disposed on the display region. Each of the color filter units is disposed correspondingly to each of the sub-pixel regions and partially overlaps the first light-shielding pattern. The dummy color filter units are disposed on the peripheral region, and the second light-shielding pattern is disposed under the dummy color filter units. Spacing between two adjacent dummy color filter units or spacing between the color filter unit and the adjacent dummy color filter unit is wider than spacing between two adjacent color filter units.

In the present invention, the dummy color filter units on the peripheral region or the color filter unit and the adjacent dummy color filter unit are modified with wider spacing in comparison with the color filter units on the display region. The difference in height around the border between the display region and the peripheral region of the color filter substrate is effectively reduced, and the related problems may also be improved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, the preferred embodiments will be made in detail. The preferred embodiments of the present invention are illustrated in the accompanying drawings with numbered elements. In addition, the terms such as "first" and "second" described in the present invention are used to distinguish different components or processes, which do not limit the sequence of the components or processes.

Figure 1:
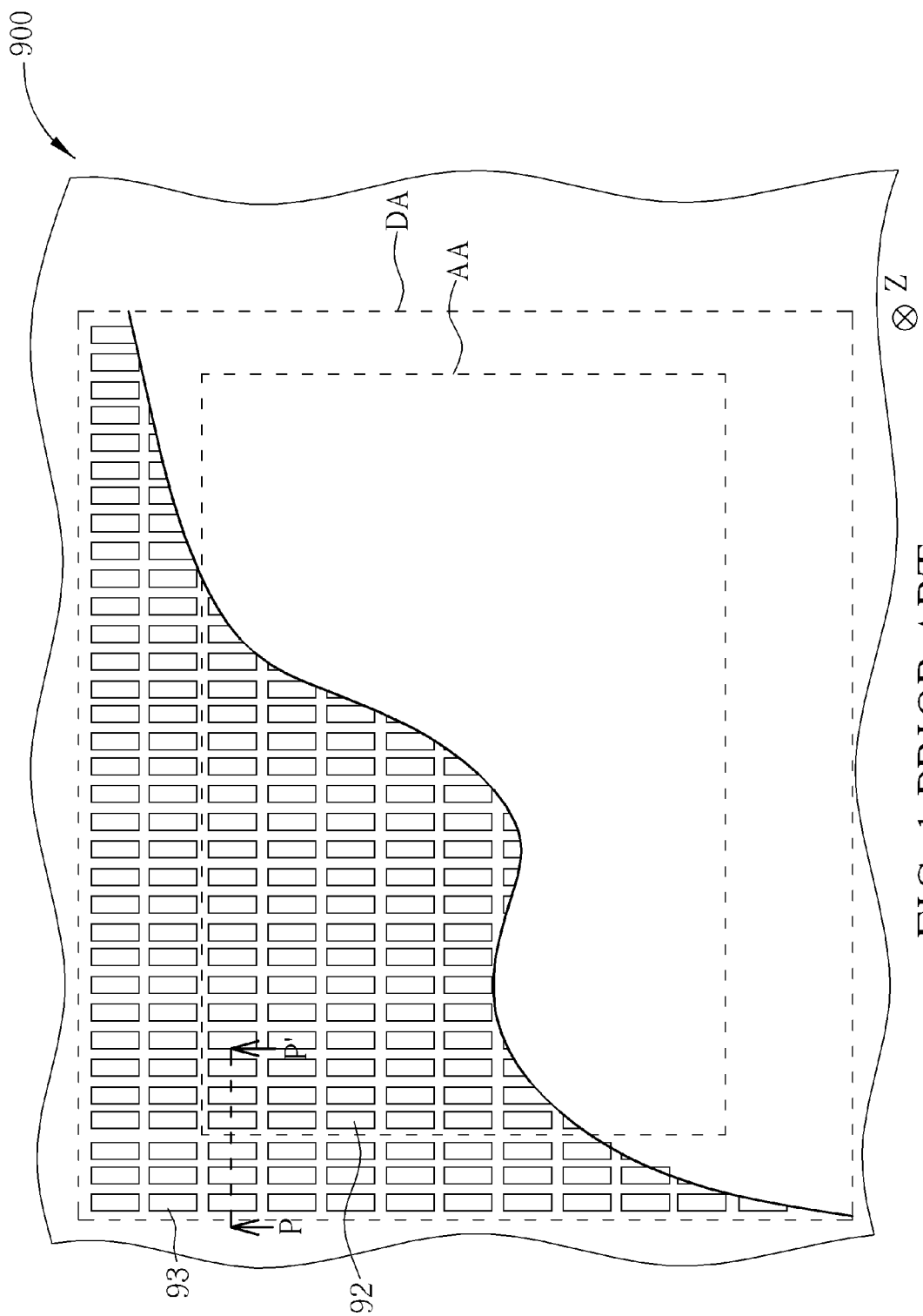
FIGS. 1-2 are schematic diagrams partially illustrating the color filter substrate according to a prior art.
Figure 2:
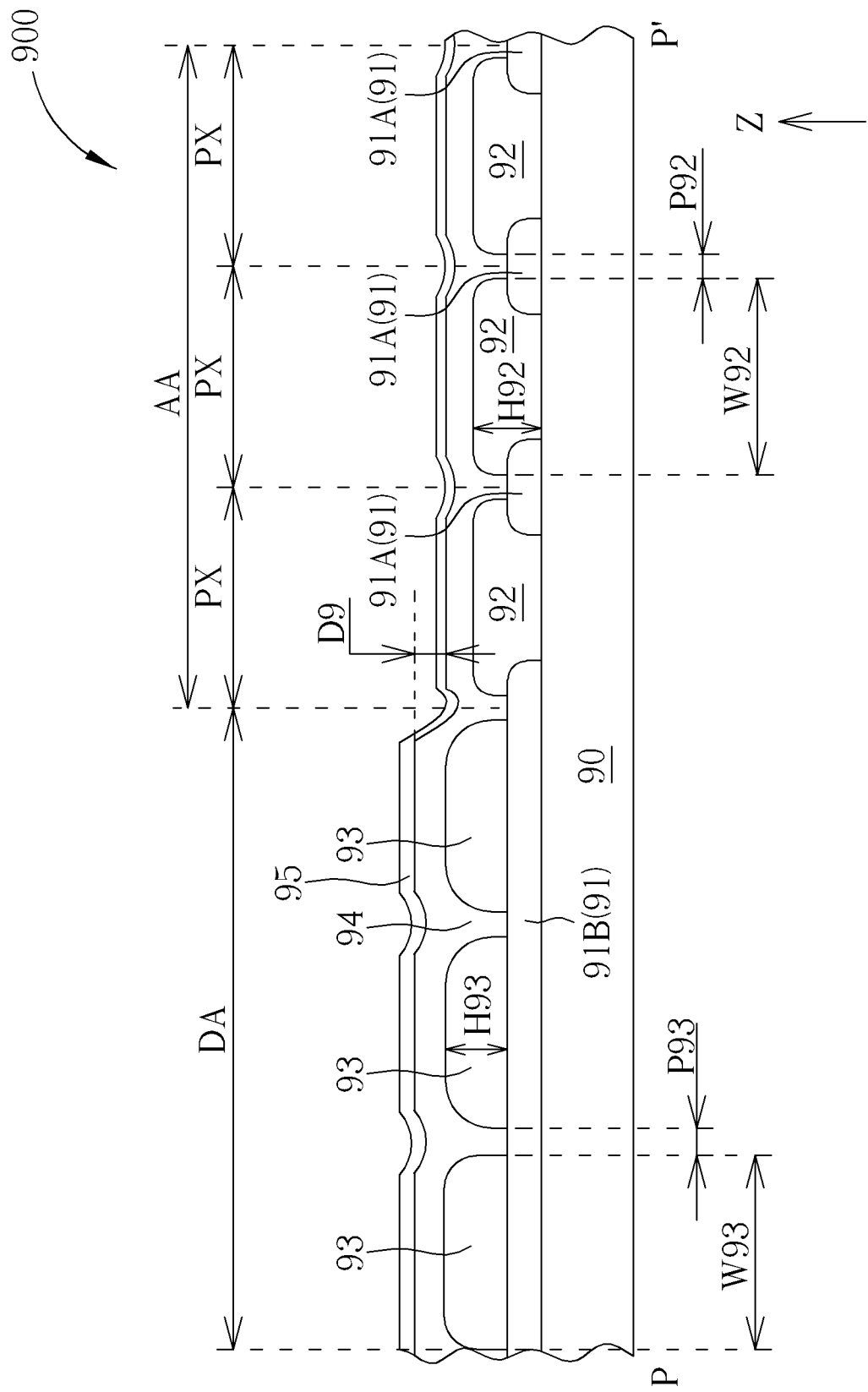
Figure 3:
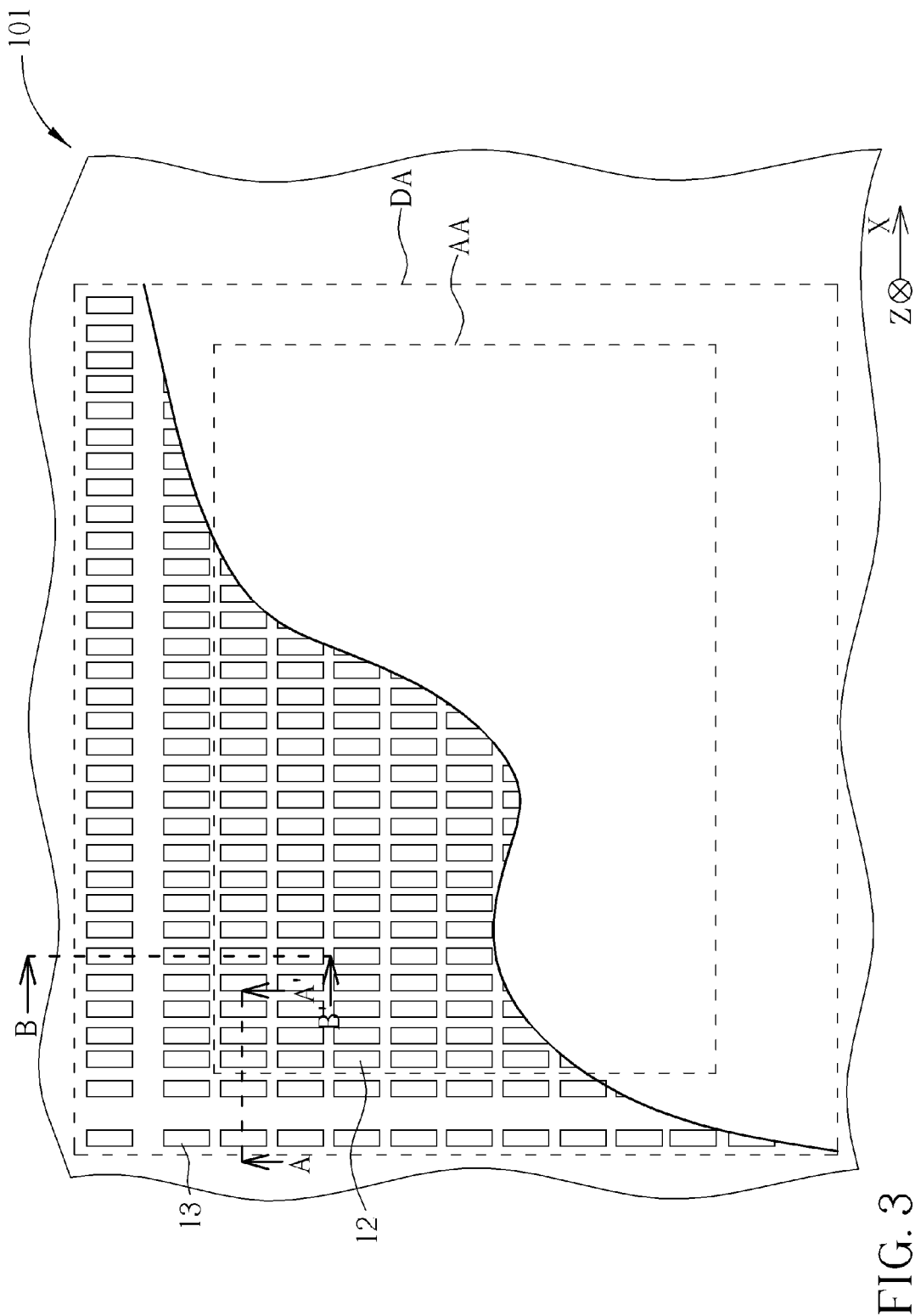
FIGS. 3-5 are schematic diagrams partially illustrating the color filter substrate according to a first preferred embodiment of the present invention.
Figure 4:
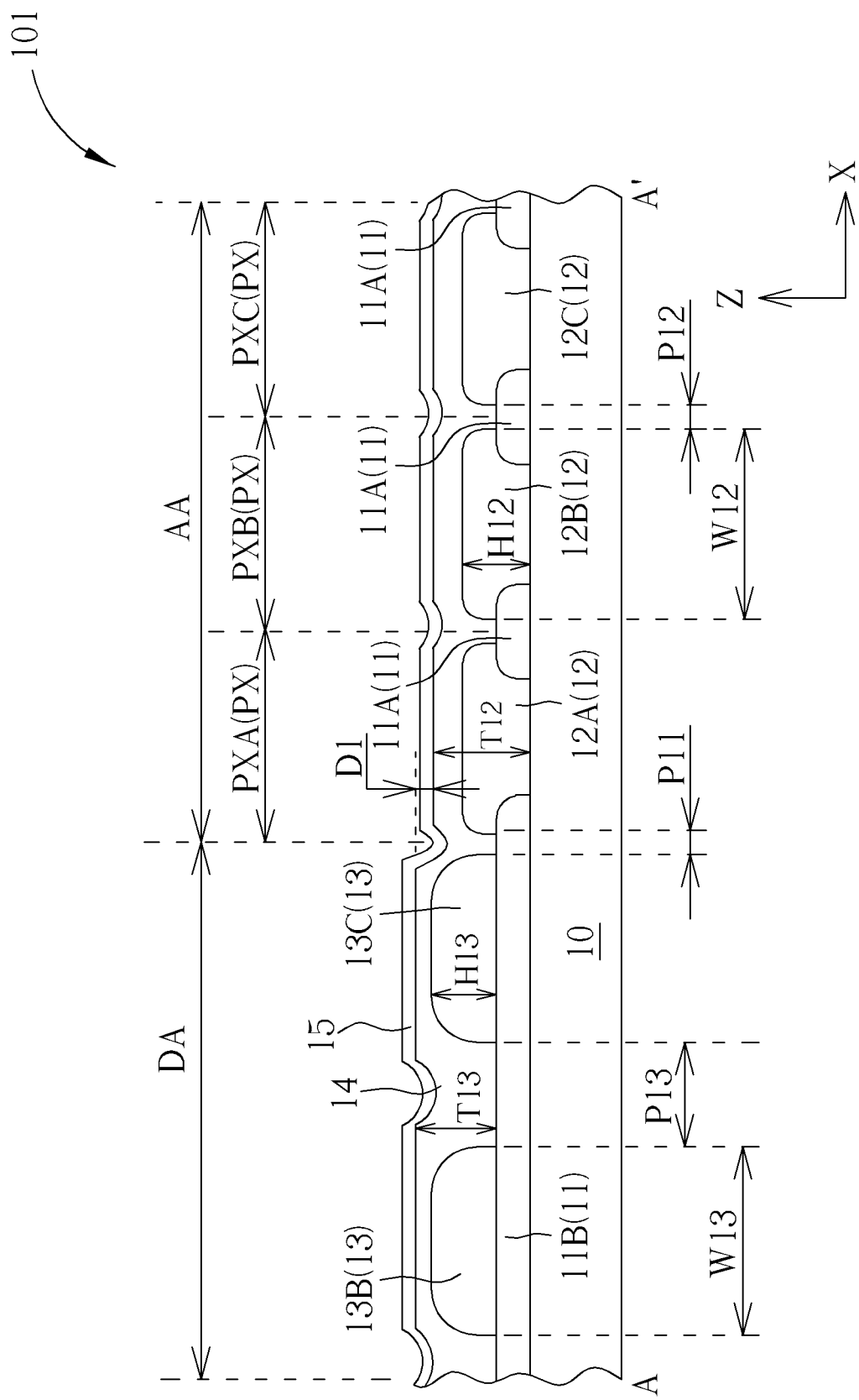
Figure 5:
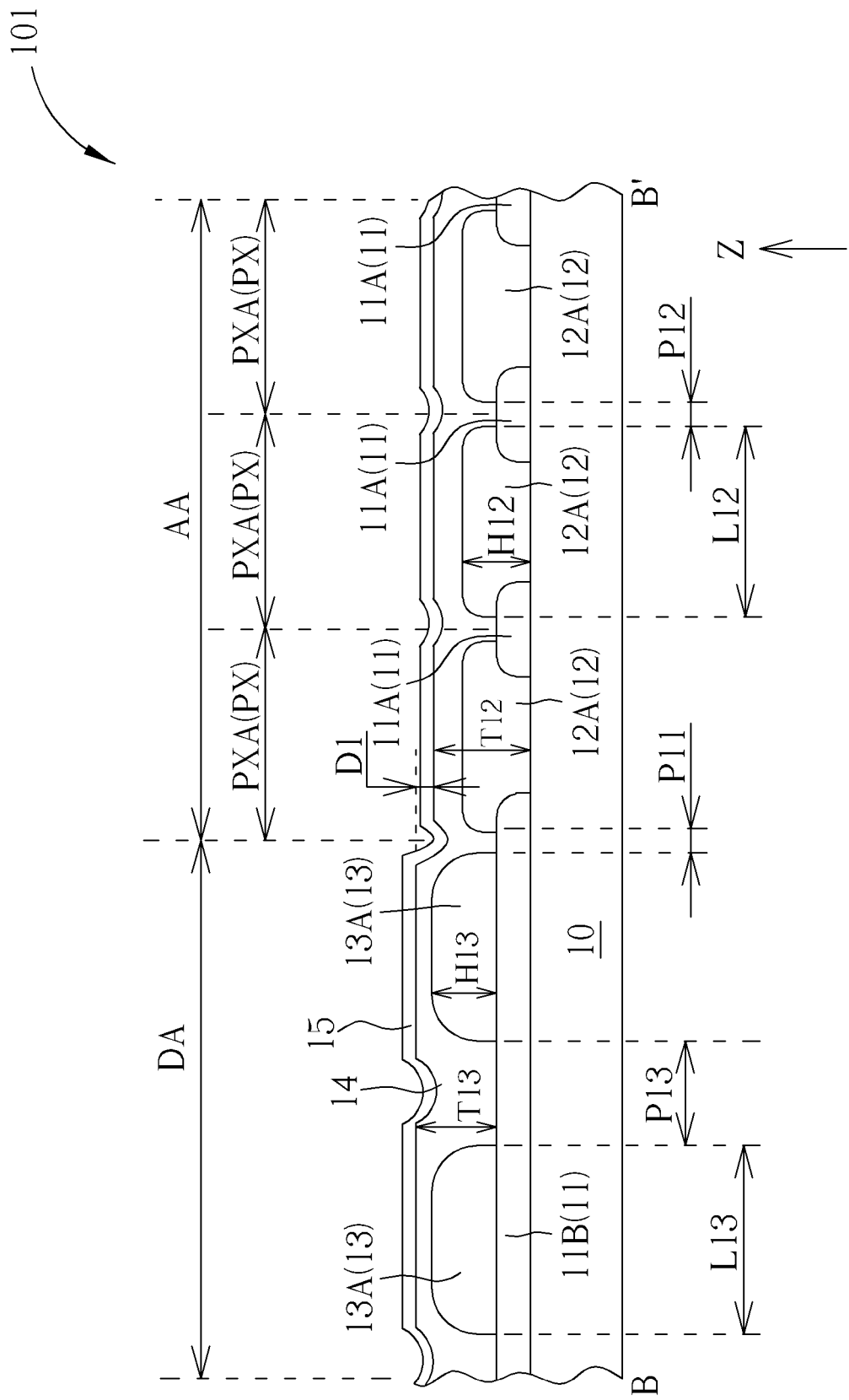

Please refer to FIGS. 3-5. FIGS. 3-5 are schematic diagrams partially illustrating the color filter substrate according to a first preferred embodiment of the present invention. FIG. 3 is a top-view diagram, FIG. 4 is a cross-sectional view diagram taken along a cross-sectional line A-A' in FIG. 3, and FIG. 5 is a cross-sectional view diagram taken along a cross-sectional line B-B' in FIG. 3. As shown in FIGS. 3-5, a color filter substrate 101 includes a transparent substrate 10, a patterned light-shielding layer 11, a plurality of color filter units 12, a plurality of dummy color filter units 13, an over-coating layer 14, and an alignment layer 15. The transparent substrate 10 has a display region AA and a peripheral region DA. The peripheral region DA surrounds the display region AA. The patterned light-shielding layer 11 is disposed on the transparent substrate 10. The patterned light-shielding layer 11 includes a first light-shielding pattern 11A disposed on the display region AA and a second light-shielding pattern 11B disposed on the peripheral region DA. In this embodiment, the patterned light-shielding layer 11 is made of light-absorbing materials, e.g. resin, metal such as chromium (Cr), and/or metal oxide such as chromium oxide ($CrO_x$), but not limited thereto. The first light-shielding pattern 11A defines a plurality of sub-pixel regions PX within the display region AA. The color filter units 12 are disposed on the display region AA, and each of the color filter units 12 is disposed correspondingly to each of the sub-pixel regions PX and partially overlaps the first light-shielding pattern 11A. In this embodiment, the sub-pixel regions PX may include a first sub-pixel region PXA, a second sub-pixel region PXB, and a third sub-pixel region PXC orderly arranged along a direction X. Respectively, the color filter units 12 may include a first color filter unit 12A corresponding to the first sub-pixel region PXA, a second color filter unit 12B corresponding to the second sub-pixel region PXB, and a third color filter unit 12C corresponding to the third sub-pixel region PXC. The first color filter unit 12A, the second color filter unit 12B, and the third color filter unit 12C are employed to display different colors such as red, green, and blue, but not limited thereto. In other words, the color filter substrate 101 may include color filter units 12 of different colors. The dummy color filter units 13 are disposed on the peripheral region DA, and the second light-shielding pattern 11B is disposed under the dummy color filter units 13 on the peripheral region DA.

In this invention, the color filter units 12 and the dummy color filter units 13 may be made of color resists of different colors, but not limited thereto. For instance, the dummy color filter units 13 may include a first dummy color filter unit 13A, a second dummy color filter unit 13B, and a third dummy color filter unit 13C. The first color filter unit 12A and the first dummy color filter unit 13A may be made of a same color resist such as a red color resist, the second color filter unit 12B and the second dummy color filter unit 13B may be made of a same color resist such as a green color resist, and the third color filter unit 12C and the third dummy color filter unit 13C may be made of a same color resist such as a blue color resist, but the present invention is not limited to this.

The dummy color filter units 13 are employed for improving the display quality around a border between the display region AA and the peripheral region DA. In addition, in order to improve the display quality by inhibiting the phenomenon of light leakage, the second light-shielding pattern 11B has to be large enough to completely block each of the dummy color filter units 13 as viewed in a direction Z normal to the transparent substrate 10. The over-coating layer 14 covers the transparent substrate 10, the patterned light-shielding layer 11, the color filter units 12, and the dummy color filter units 13. The alignment layer 15 is disposed on the over-coating layer 14.

It is worth noticing that, in this invention, spacing P13 between two adjacent dummy color filter units 13 or spacing P11 between the color filter unit 12 and the adjacent dummy color filter unit 13 is substantially wider than spacing P12 between two adjacent color filter units 12. Therefore, the slope of the border area between the display region AA and the peripheral region DA is lowered and the related problems, such as light leakage, arising from subsequent rubbing process on the alignment layer 15 may be accordingly improved.

In this embodiment, the spacing P13 is directly widened to make the spacing P13 substantially wider than spacing P12. Specifically, a ratio of the spacing P13 to the spacing P12 is preferably between 1.2 and 3, but not limited thereto. Because the spacing P13 on the peripheral region DA is wider than the spacing P12 on the display region AA, the over-coating layer 14 formed on the peripheral region DA has wider spacing to be filled. Therefore, a distance T13 from a surface of the over-coating layer 14 to a surface of the second light-shielding pattern 11B within the peripheral region DA may become smaller than a distance T12 from the surface of the over-coating layer 14 to a surface of the transparent substrate 10 within the display region AA, and a difference D1 in height between the over-coating layer 14 on the peripheral region DA and the over-coating layer 14 on the display region AA may be reduced so that the over-coating layer 14 may be relatively flattened comparing to prior art. Therefore, the slope of the border area between the display region AA and the peripheral region DA is lowered and the related problems, such as light leakage, arising from subsequent rubbing process on the alignment layer 15 may be accordingly improved.

As shown in FIGS. 3-5, in this embodiment, at least some of the color filter units 12 are disposed adjacent to the dummy color filter units 13 around the border between the display region AA and the peripheral region DA, and the spacing P11 between the color filter unit 12 and the adjacent dummy color filter unit 13 around the border may be substantially wider than the spacing P12 between the two adjacent color filter units 12 on the display region AA for optimizing a contour of the over-coating layer 14 around the border between the display region AA and the peripheral region DA, but the present invention is not limited to this, the spacing P11 may also be equal to the spacing P12. A ratio of the spacing P11 between the color filter unit 12 and the adjacent dummy color filter unit 13 around the border to the spacing P12 between two adjacent color filter units 12 on the display region AA is preferably between 1.2 and 3, but not limited thereto.

In addition, in order to further widen spacing P13, an area of each of the dummy color filter units 13 may be smaller than an area of each of the color filter units 12, for example, a width W13 of each of the dummy color filter units 13 may be substantially smaller than a width W12 of each of the color filter units 12, or a length L13 of each of the dummy color filter units 13 may be substantially smaller than a length L12 of each of the color filter units 12, but not limited thereto, so that the spacing P13 is substantially much wider than the spacing P12. Specifically, a ratio of the area of the dummy color filter unit 13 to the area of the color filter unit 12 is preferably between 0.2 and 0.8, but not limited thereto. In this embodiment, a thickness H13 of each of the dummy color filter units 13 is substantially equal to a thickness H12 of each of the color filter units 12. However, for further reducing the difference D1 in height between the over-coating layer 14 on the peripheral region DA and the over-coating layer 14 on the display region AA, the thickness H13 of each of the dummy color filter units 13 may be substantially thinner than the thickness H12 of each of the color filter units 12. An additional process, such as a exposure process with a half tone mask or a gray tone mask, may be applied for forming the color filter units 12 and the dummy color filter units 13 with different thicknesses, but the present invention is not limit to this and may include other methods for forming the color filter units 12 and the dummy color filter units 13 with different thicknesses.

The following description will detail the different embodiments of the color filter substrate in the present invention. To simplify the description, the identical components in each of the following embodiments are marked with identical symbols. For making it easier to compare the difference between the embodiments, the following description will detail the dissimilarities among different embodiments and the identical features will not be redundantly described.

Figure 6:
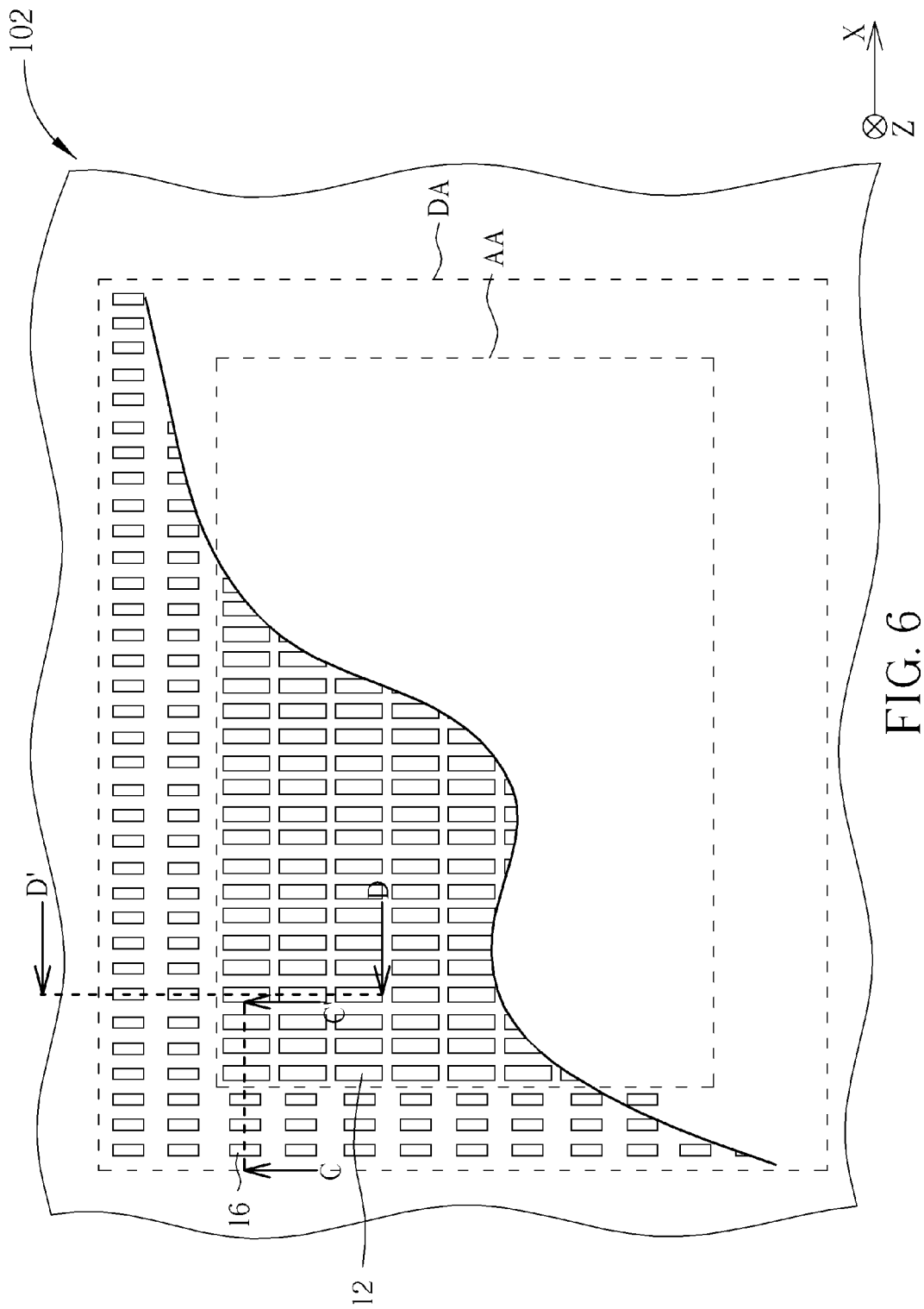
FIGS. 6-8 are schematic diagrams partially illustrating the color filter substrate according to a second preferred embodiment of the present invention.
Figure 7:
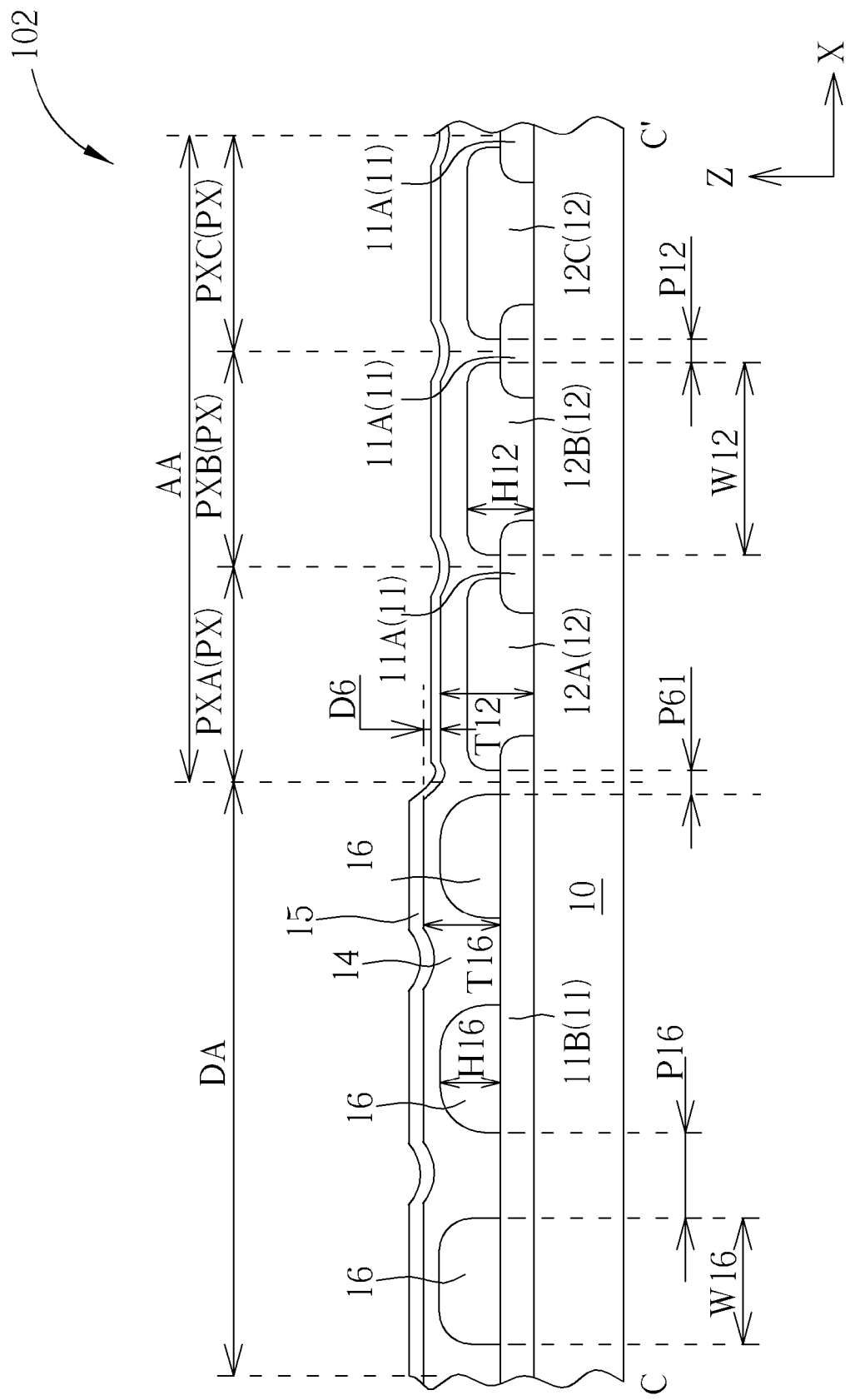
Figure 8:
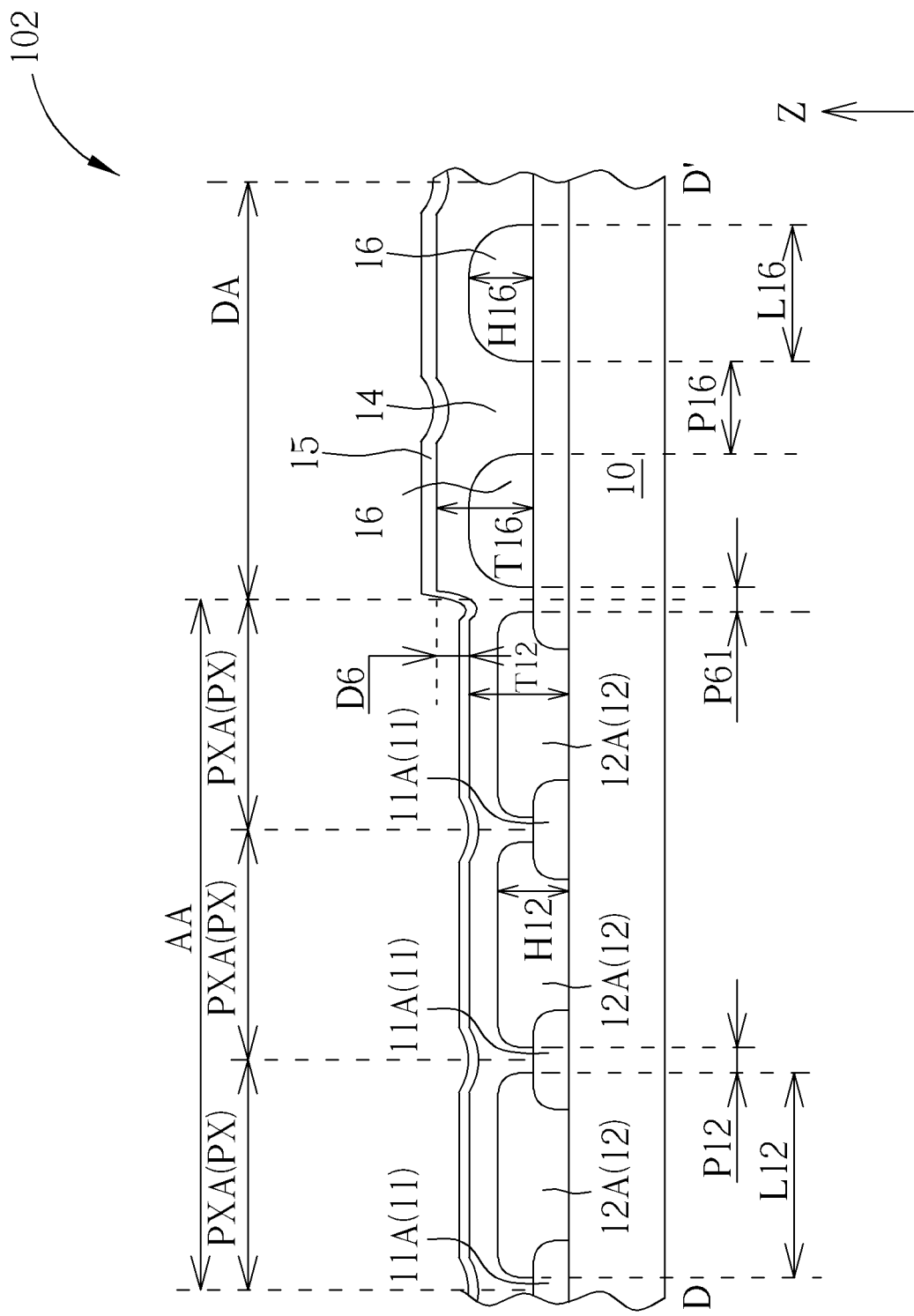

Please refer to FIGS. 6-8. FIGS. 6-8 are schematic diagrams partially illustrating the color filter substrate according to a second preferred embodiment of the present invention. FIG. 6 is a top-view diagram, FIG. 7 is a cross-sectional view diagram taken along a cross-sectional line C-C' in FIG. 6, and FIG. 8 is a cross-sectional view diagram taken along a cross-sectional line D-D' in FIG. 6. As shown in FIGS. 6-8, in a color filter substrate 102 of this embodiment, in order to widen spacing P16 between two adjacent dummy color filter units 16, an area of each of the dummy color filter units 16 is smaller than an area of each of the color filter units 12, for example, a width W16 of each of the dummy color filter units 16 is substantially smaller than a width W12 of the color filter units 12, or a length L16 of each of the dummy color filter units 16 is substantially smaller than a length L12 of each of the color filter units 12, but not limited thereto, so that the spacing P16 is substantially wider than the spacing P12. Specifically, a ratio of the area of the dummy color filter unit 16 to the area of the color filter unit 12 is preferably between 0.2 and 0.8, but not limited thereto. Additionally, in this embodiment, spacing P61 between the color filter unit 12 and the adjacent dummy color filter unit 16 may be substantially equal to the spacing P12 between two adjacent color filter units 12, but not limited thereto. A thickness H16 of each of the dummy color filter units 16 is substantially equal to a thickness H12 of each of the color filter units 12, but not limited thereto. In this embodiment, because the spacing P16 on the peripheral region DA is wider than the spacing P12 on the display region AA, the over-coating layer 14 formed on the peripheral region DA may have wider spacing to be filled. Therefore, a distance T16 from a surface of the over-coating layer 14 to a surface of the second light-shielding pattern 11B within the peripheral region DA may become smaller than a distance T12 from the surface of the over-coating layer 14 to a surface of the transparent substrate 10 within the display region AA and a difference D6 in height between the over-coating layer 14 on the peripheral region DA and the over-coating layer 14 on the display region AA may be reduced so that the over-coating layer 14 may be relatively flattened comparing to prior art. Therefore, the slope of the border area between the display region AA and the peripheral region DA in the color filter substrate 102 is lowered and the related problems, such as light leakage, arising from subsequent rubbing process on the alignment layer 15 may be accordingly improved.

Figure 9:
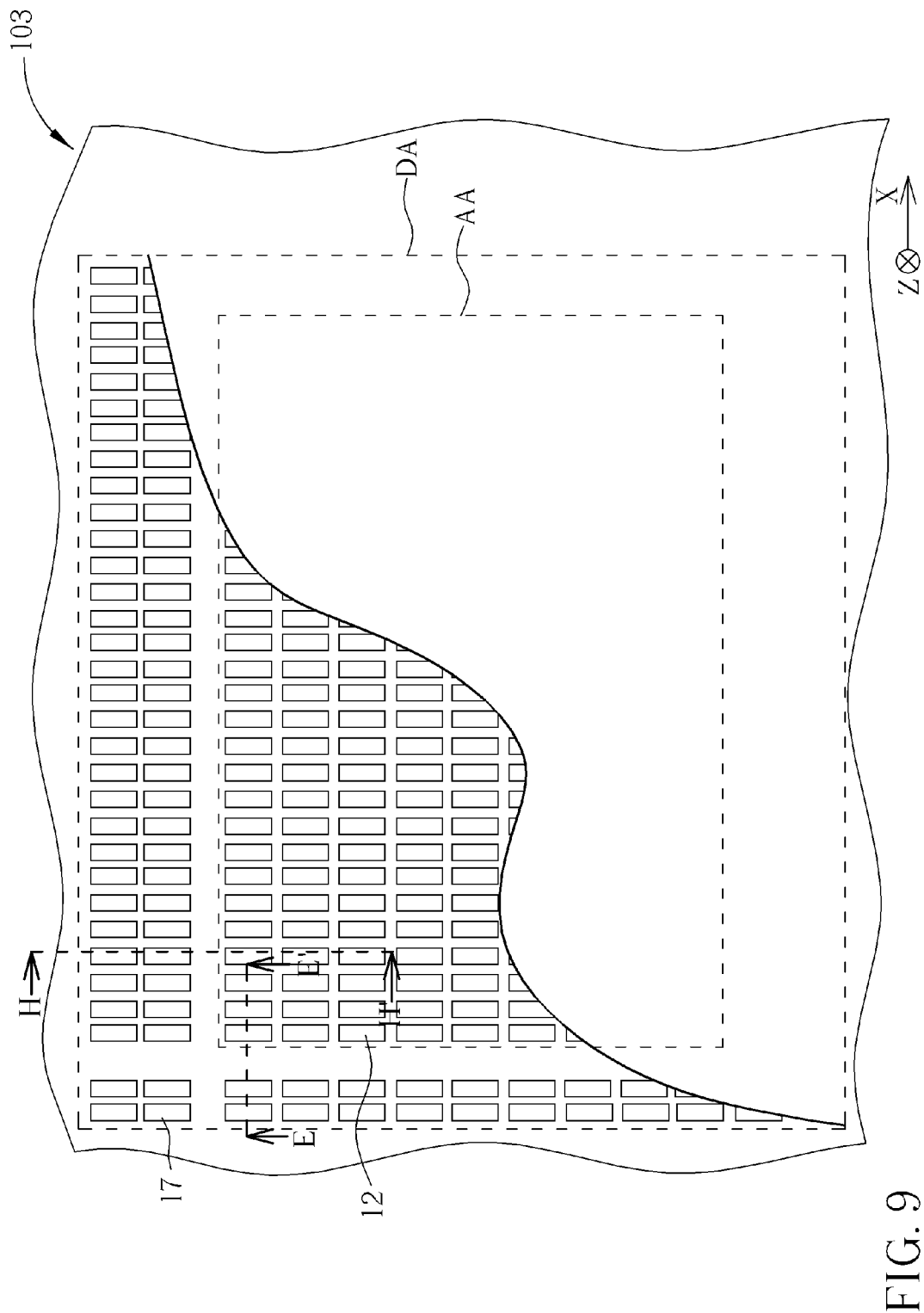
FIGS. 9-11 are schematic diagrams partially illustrating the color filter substrate according to a third preferred embodiment of the present invention.
Figure 10:
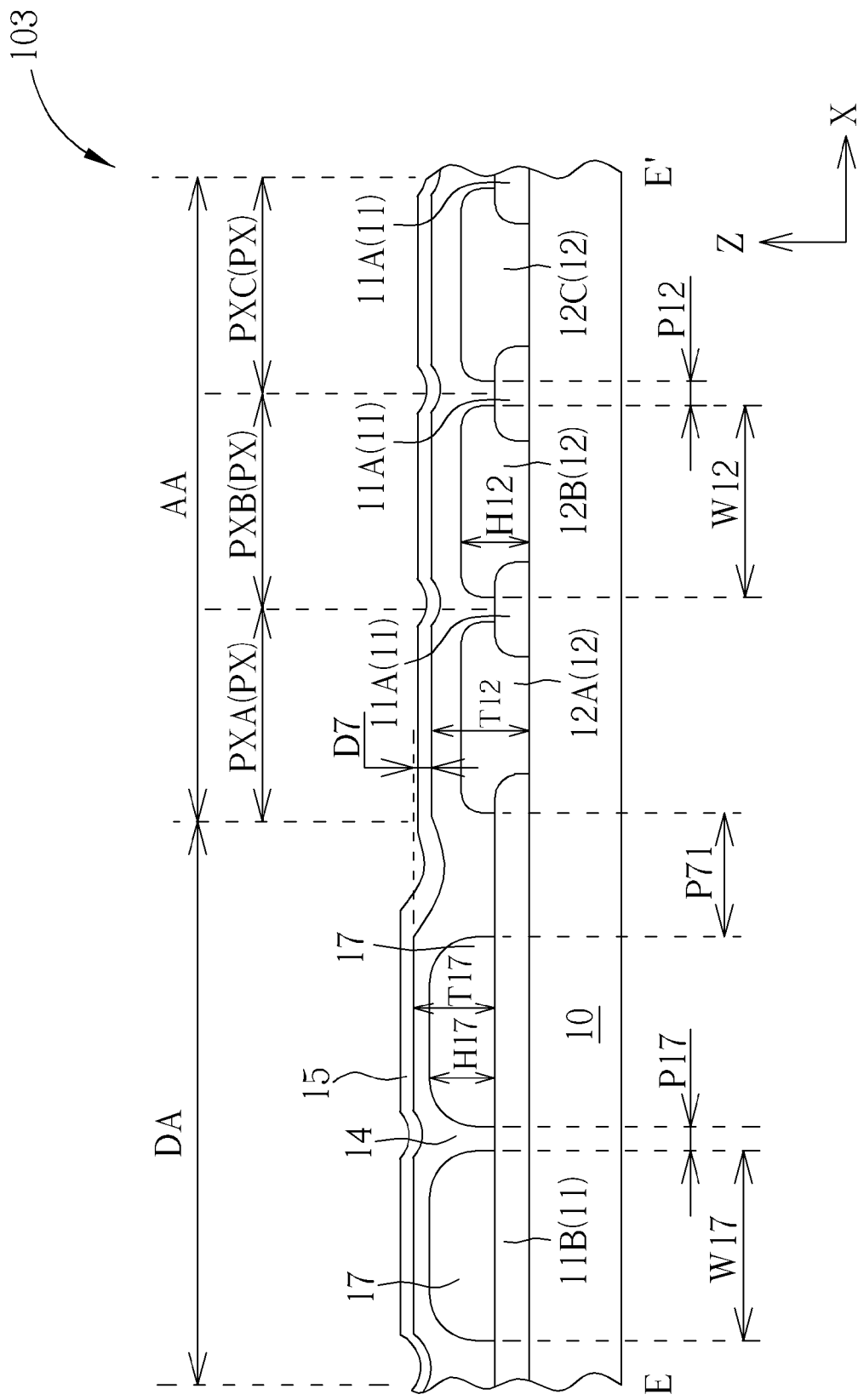
Figure 11:
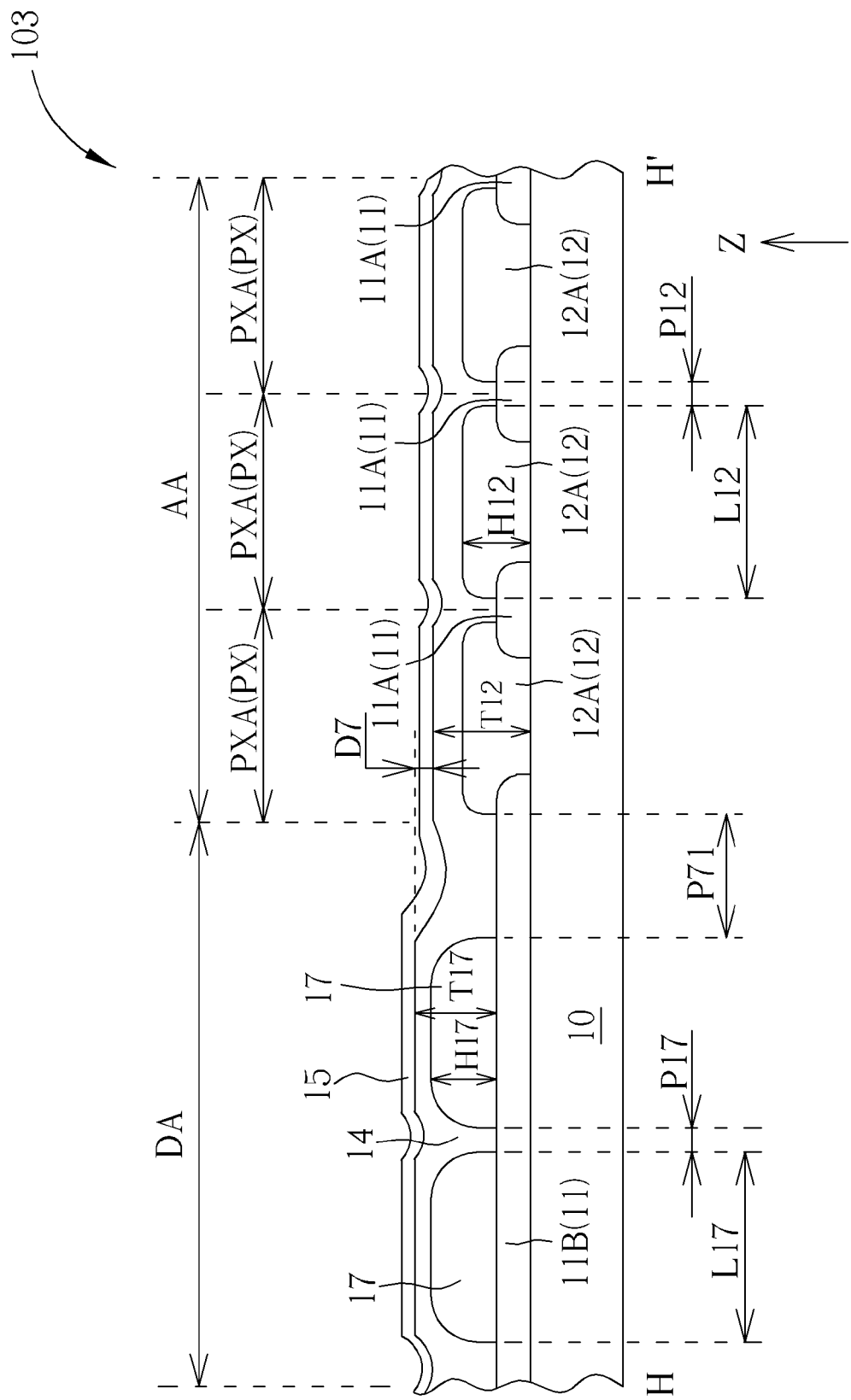

Please refer to FIGS. 9-11. FIGS. 9-11 are schematic diagrams partially illustrating the color filter substrate according to a third preferred embodiment of the present invention. FIG. 9 is a top-view diagram, FIG. 10 is a cross-sectional view diagram taken along a cross-sectional line E-E' in FIG. 9, and FIG. 11 is a cross-sectional view diagram taken along a cross-sectional line H-H' in FIG. 9. As shown in FIGS. 9-11, in a color filter substrate 103 of this embodiment, spacing P71 between the color filter unit 12 and an adjacent dummy color filter unit 17 is substantially wider than the spacing P12 between two adjacent color filter units 12. Spacing P17 between the dummy color filter 17 may be equal to the spacing P12 between the color filter units 12, but not limited thereto. A ratio of the spacing P71 between the color filter unit 12 and the adjacent dummy color filter unit 17 around the border to the spacing P12 between two adjacent color filter units 12 on the display region AA is preferably between 1.2 and 3, but not limited thereto. In addition, in this embodiment, an area of each of the dummy color filter units 17 may be substantially equal to an area of each of the color filter units 12, for example, a width W17 of each of the dummy color filter units 17 may be substantially equal to a width W12 of the color filter units 12, and a length L17 of each of the dummy color filter units 17 may be substantially equal to a length L12 of each of the color filter units 12, but not limited thereto. In this embodiment, a thickness H17 of each of the dummy color filter units 17 is substantially equal to a thickness H12 of each of the color filter units 12. A distance T17 from a surface of the over-coating layer 14 to a surface of the second light-shielding pattern 11B within the peripheral region DA may become smaller than a distance T12 from the surface of the over-coating layer 14 to a surface of the transparent substrate 10 within the display region AA, and a difference D7 in height between the over-coating layer 14 on the peripheral region DA and the over-coating layer 14 on the display region AA may be reduced. Therefore, the slope of the border area between the display region AA and the peripheral region DA in the color filter substrate 103 is lowered and the related problems, such as light leakage, arising from subsequent rubbing process on the alignment layer 15 may be accordingly improved.

Figure 12:
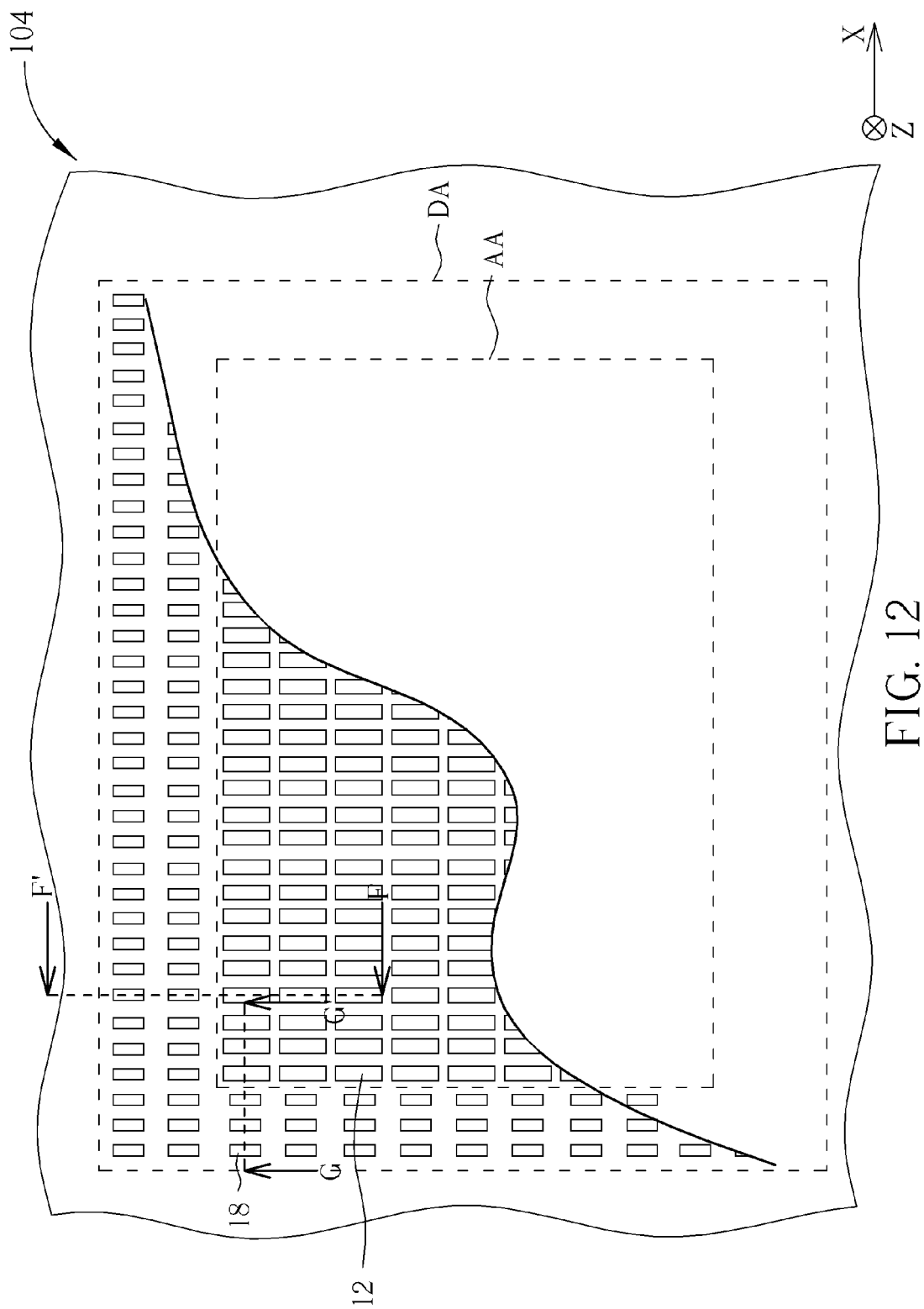
FIGS. 12-14 are schematic diagrams partially illustrating the color filter substrate according to a fourth preferred embodiment of the present invention.
Figure 13:
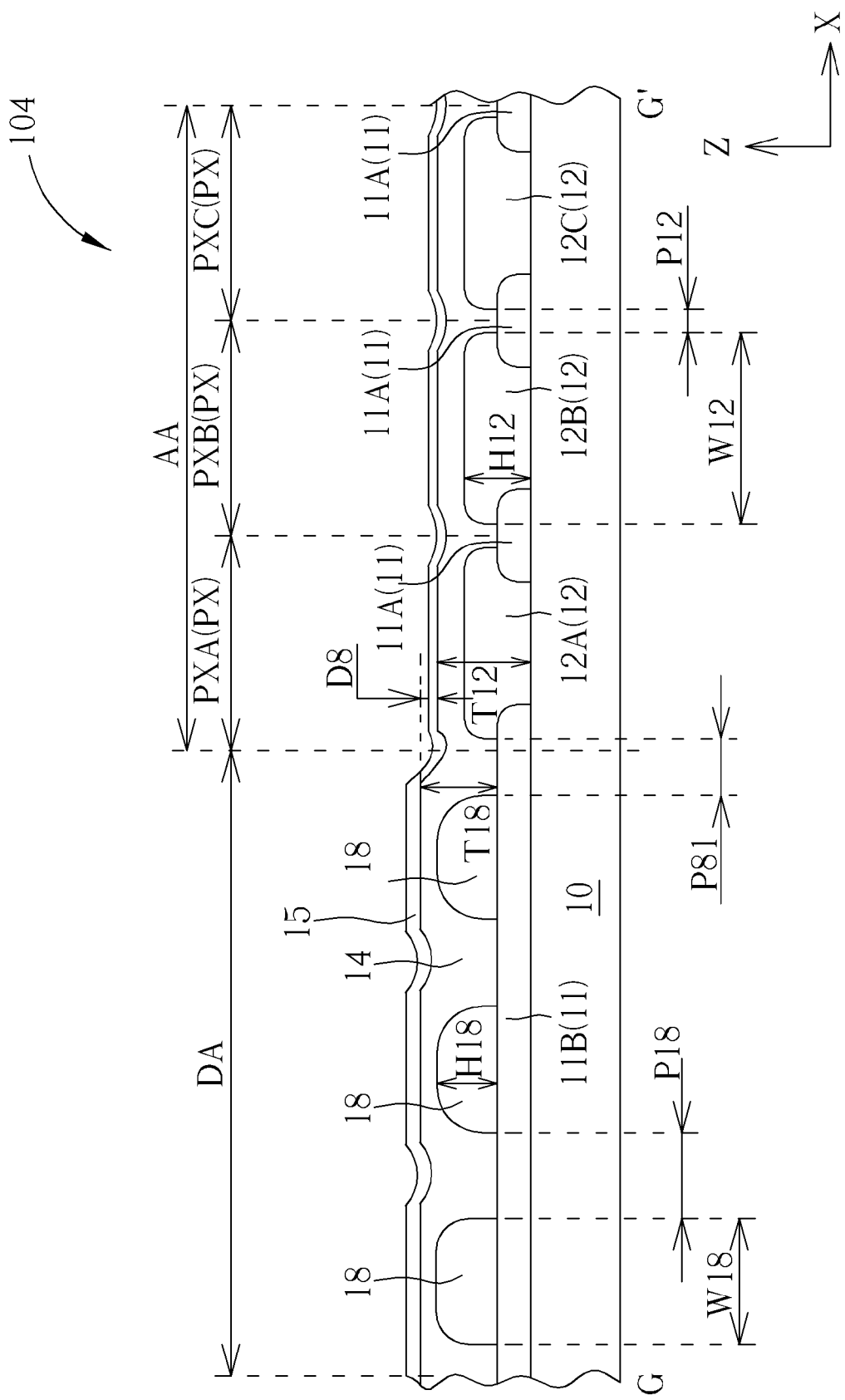
Figure 14:
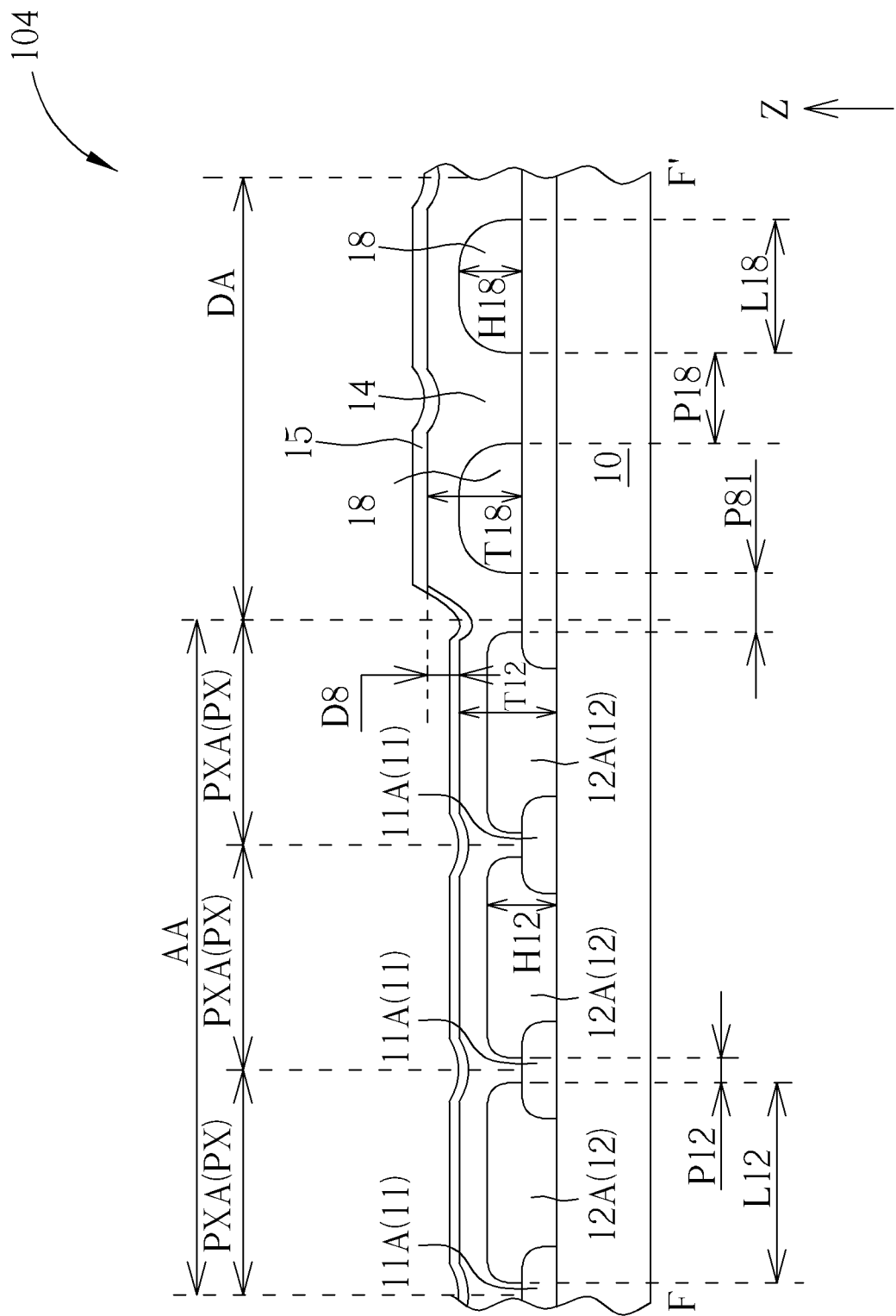

Please refer to FIGS. 12-14. FIGS. 12-14 are schematic diagrams partially illustrating the color filter substrate according to a fourth preferred embodiment of the present invention. FIG. 12 is a top-view diagram, FIG. 13 is a cross-sectional view diagram taken along a cross-sectional line G-G' in FIG. 12, and FIG. 14 is a cross-sectional view diagram taken along a cross-sectional line F-F' in FIG. 12. As shown in FIGS. 12-14, in a color filter substrate 104 of this embodiment, spacing P18 between two adjacent dummy color filter units 18 is substantially wider than the spacing P12 between two adjacent color filter units 12, and spacing P81 between the color filter unit 12 and the adjacent dummy color filter unit 18 around the border is substantially wider than the spacing P12 between the two adjacent color filter units 12 on the display region AA for optimizing a contour of the over-coating layer 14 around the border between the display region AA and the peripheral region DA so that the over-coating layer 14 formed on the peripheral region DA may have wider spacing to be filled. Therefore, a distance T18 from a surface of the over-coating layer 14 to a surface of the second light-shielding pattern 11B within the peripheral region DA may become much smaller than a distance T12 from the surface of the over-coating layer 14 to a surface of the transparent substrate 10 within the display region AA and a difference D8 in height between the over-coating layer 14 on the peripheral region DA and the over-coating layer 14 on the display region AA may be reduced so that the over-coating layer 14 may be relatively flattened comparing to prior art. Therefore, the slope of the border area between the display region AA and the peripheral region DA in the color filter substrate 104 is lowered and the related problems, such as light leakage, arising from subsequent rubbing process on the alignment layer 15 may be accordingly improved.

In addition, in order to widen spacing P18 more, an area of each of the dummy color filter units 18 is smaller than an area of each of the color filter units 12, for example, a width W18 of each of the dummy color filter units 18 is substantially smaller than a width W12 of each of the color filter units 12, or a length L18 of each of the dummy color filter units 18 is substantially smaller than a length L12 of each of the color filter units 12, but not limited thereto, so that the spacing P18 is substantially much wider than spacing P12, and the border between the display region AA and the peripheral region DA in the color filter substrate 104 may be smoother. Specifically, a ratio of the area of the dummy color filter unit 18 to the area of the color filter unit 12 is preferably between 0.2 and 0.8, but not limited thereto.

Figure 15:
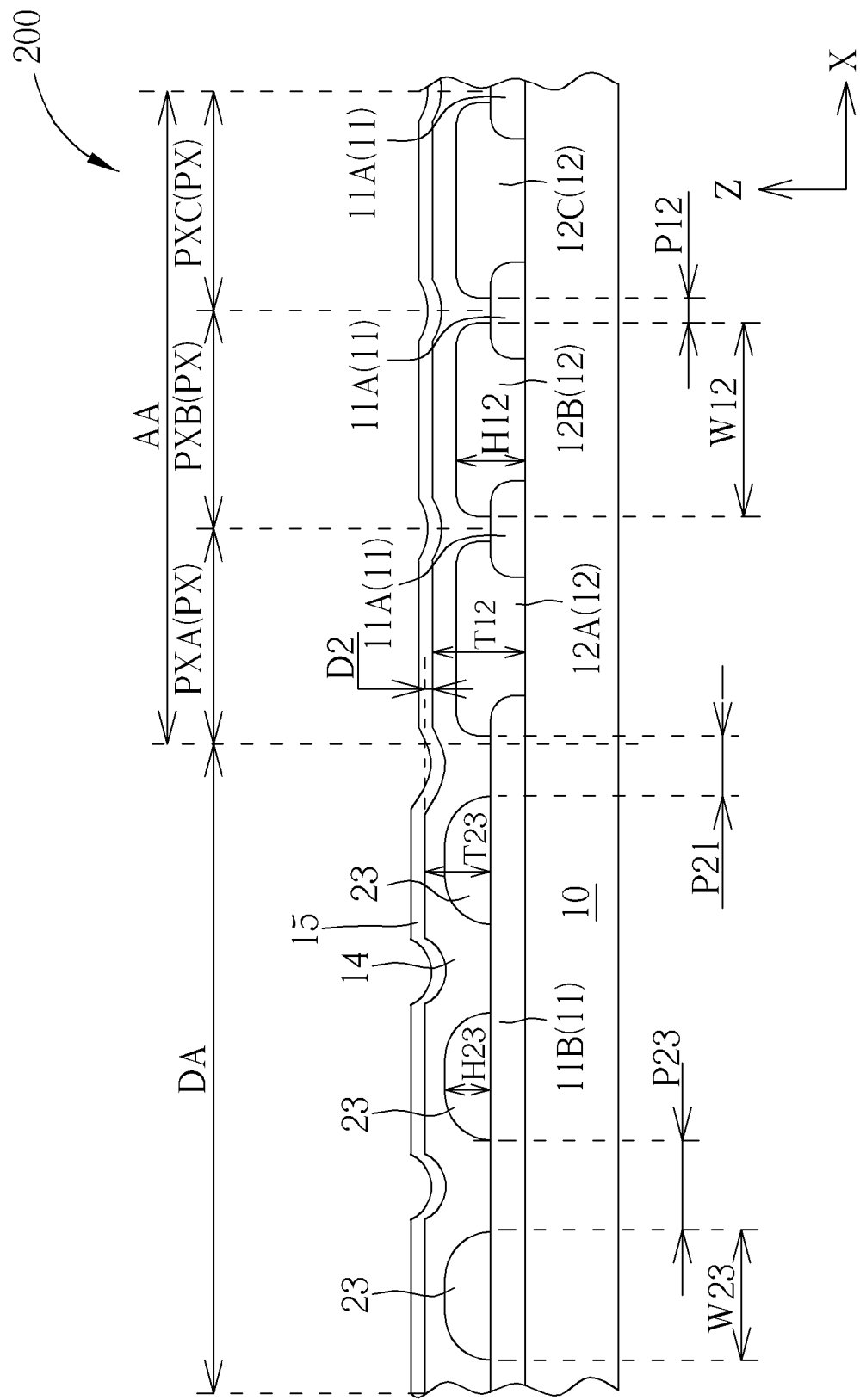
FIG. 15 is a schematic diagram partially illustrating the color filter substrate according to a fifth preferred embodiment of the present invention.

Please refer to FIG. 15. FIG. 15 is a schematic diagram partially illustrating the color filter substrate according to a fifth preferred embodiment of the present invention. As shown in FIG. 15, in this embodiment, a color filter substrate 200 includes a transparent substrate 10, a patterned light-shielding layer 11, a plurality of color filter units 12, a plurality of dummy color filter units 23, an over-coating layer 14, and an alignment layer 15. In this embodiment, spacing P23 between two adjacent dummy color filter units 23 is substantially wider than the spacing P12 between two adjacent color filter units 12, spacing P21 between the color filter unit 12 and the adjacent dummy color filter unit 23 around the border between the display region AA and the peripheral region DA is substantially wider than the spacing P12 between the two adjacent color filter units 12 on the display region AA, and a thickness H23 of each of the dummy color filter units 23 is substantially thinner than a thickness H12 of each of the color filter units 12 so that the over-coating layer 14 formed on the peripheral region DA may have wider spacing to be filled. Therefore, a distance T23 from the surface of the over-coating layer 14 to the surface of the second light-shielding pattern 11B within the peripheral region DA may become much smaller than the distance T12 from the surface of the over-coating layer 14 to a surface of the transparent substrate 10 within the display region AA and a difference D2 in height between the over-coating layer 14 on the peripheral region DA and the over-coating layer 14 on the display region AA may be reduced. Therefore, the slope of the border area between the display region AA and the peripheral region DA is lowered.

In addition, an area of each of the dummy color filter units 23 is substantially smaller than an area of each of the color filter units 12 as viewed in the direction Z, for example, a width W23 of each of the dummy color filter units 23 is substantially smaller than a width W12 of each of the color filter units 12, or a length (not shown) of each of the dummy color filter units 23 is substantially smaller than a length (not shown) of each of the color filter units 12. Except for the dummy color filter units 23, the color filter substrate 200 of this embodiment is similar to the color filter substrate 104 of the fourth preferred embodiment detailed above and will not be redundantly described.

Figure 16:
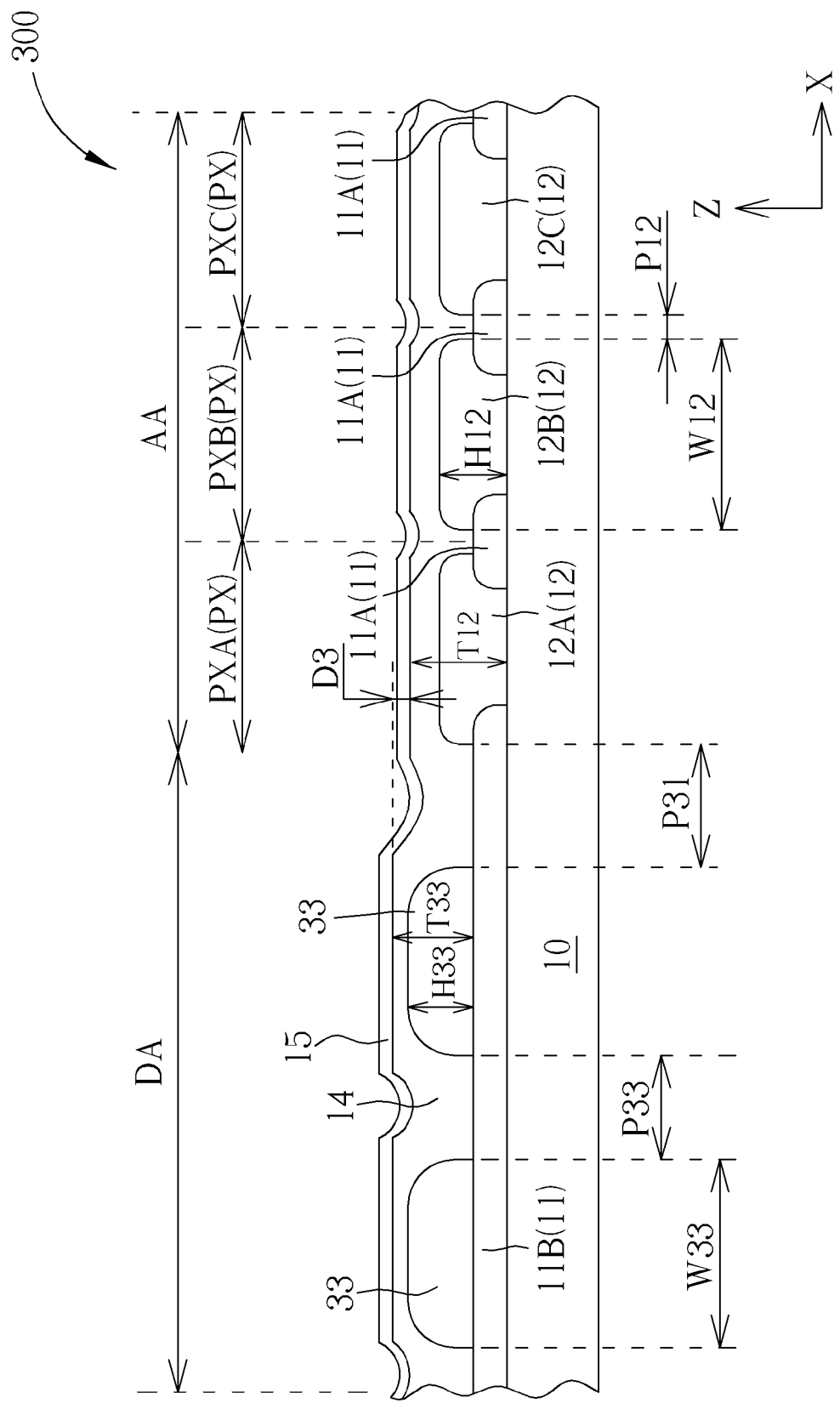
FIG. 16 is a schematic diagram partially illustrating the color filter substrate according to a sixth preferred embodiment of the present invention.

Please refer to FIG. 16. FIG. 16 is a schematic diagram partially illustrating the color filter substrate according to a sixth preferred embodiment of the present invention. As shown in FIG. 16, in this embodiment, a color filter substrate 300 includes a transparent substrate 10, a patterned light-shielding layer 11, a plurality of color filter units 12, a plurality of dummy color filter units 33, an over-coating layer 14, and an alignment layer 15. In this embodiment, spacing P33 between two adjacent dummy color filter units 33 is substantially wider than the spacing P12 between two adjacent color filter units 12, and spacing P31 between the color filter unit 12 and the adjacent dummy color filter unit 33 around the border between the display region AA and the peripheral region DA is substantially wider than the spacing P12 between the two adjacent color filter units 12 on the display region AA so that the over-coating layer 14 formed on the peripheral region DA may have wider spacing to be filled. Therefore, a distance T33 from the surface of the over-coating layer 14 to the surface of the second light-shielding pattern 11B within the peripheral region DA may become smaller than the distance T12 from the surface of the over-coating layer 14 to a surface of the transparent substrate 10 within the display region AA and a difference D3 in height between the over-coating layer 14 on the peripheral region DA and the over-coating layer 14 on the display region AA may be further reduced. Therefore, the slope of the border area between the display region AA and the peripheral region DA is lowered.

It is worth noticing that, in this embodiment, an area of each of the dummy color filter units 33 is substantially equal to an area of each of the color filter units 12 as viewed in the direction Z, for example, a width W33 of each of the dummy color filter units 33 is substantially equal to a width W12 of each of the color filter units 12, and a length (not shown) of each of the dummy color filter units 33 is substantially equal to a length (not shown) of each of the color filter units 12. Additionally, a thickness H33 of each of the dummy color filter units 33 may be substantially equal to a thickness H12 of each of the color filter units 12. In other words, except for the spacing P12, the spacing P33 and the spacing P31, the dummy color filter units 33 are similar to the color filter units 12 in shape, and related manufacturing process may accordingly be simplified. Except for the dummy color filter units 33, the color filter substrate 300 of this embodiment is similar to the color filter substrate 104 of the fourth preferred embodiment detailed above and will not be redundantly described.

Figure 17:
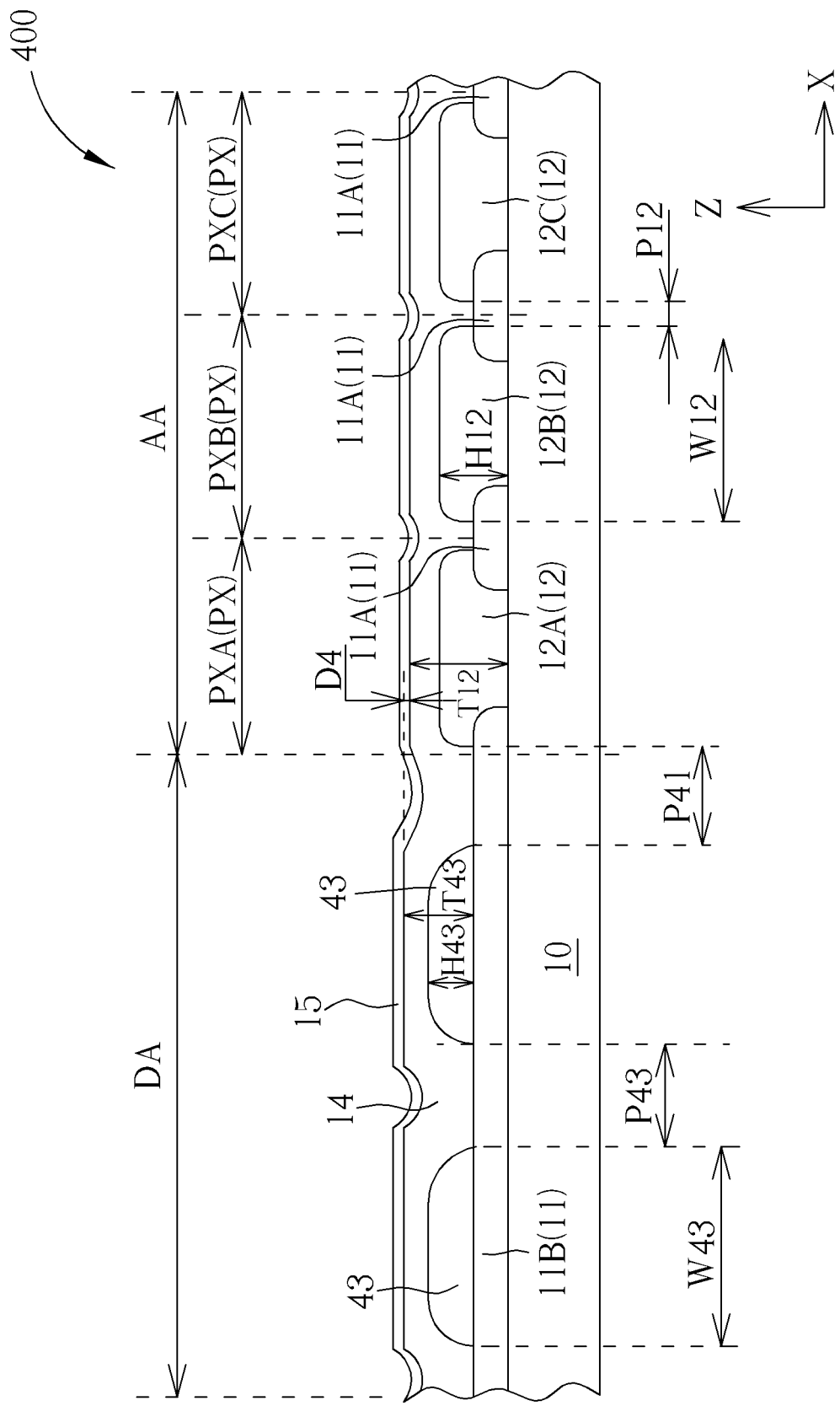
FIG. 17 is a schematic diagram partially illustrating the color filter substrate according to a seventh preferred embodiment of the present invention.

Please refer to FIG. 17. FIG. 17 is a schematic diagram partially illustrating the color filter substrate according to a seventh preferred embodiment of the present invention. As shown in FIG. 17, in this embodiment, a color filter substrate 400 includes a transparent substrate 10, a patterned light-shielding layer 11, a plurality of color filter unit 12, a plurality of dummy color filter unit 43, an over-coating layer 14, and an alignment layer 15. In this embodiment, spacing P43 between two adjacent dummy color filter units 43 is substantially wider than the spacing P12 between two adjacent color filter units 12, spacing P41 between the color filter unit 12 and the adjacent dummy color filter unit 43 around the border between the display region AA and the peripheral region DA is substantially wider than the spacing P12 between the two adjacent color filter units 12 on the display region AA, and a thickness H43 of each of the dummy color filter units 43 is substantially thinner than a thickness H12 of each of the color filter units 12 so that the over-coating layer 14 formed on the peripheral region DA may have wider spacing to be filled. Therefore, a distance T43 from the surface of the over-coating layer 14 to a surface of the second light-shielding pattern 11B within the peripheral region DA may become smaller than the distance T12 from the surface of the over-coating layer 14 to the surface of the transparent substrate 10 within the display region AA and a difference D4 in height between the over-coating layer 14 on the peripheral region DA and the over-coating layer 14 on the display region AA may be reduced. Therefore, the slope of the border area between the display region AA and the peripheral region DA is lowered.

It is worth noticing that, in this embodiment, an area of each of the dummy color filter units 43 is substantially equal to an area of each of the color filter units 12 as viewed in the direction Z, for example, a width W43 of each of the dummy color filter units 43 is substantially equal to a width W12 of the color filter units 12, and a length (not shown) of each of the dummy color filter units 43 is substantially equal to a length (not shown) of each of the color filter units 12, and related manufacturing process may accordingly be simplified. Except for the dummy color filter units 43, the color filter substrate 400 of this embodiment is similar to the color filter substrate 104 of the fourth preferred embodiment detailed above and will not be redundantly described.

In conclusion, the spacing between each of the dummy color filter units or the spacing between the color filter unit and the adjacent dummy color filter unit around the border between the display region AA and the peripheral region DA may be widened for improving the difference in height around the border between the display region and the peripheral region of the color filter substrate in the present invention, and the related problems may be accordingly improved.

Those skilled in the art will readily observe that numerous modifications and alterations of the device and method may be made while retaining the teachings of the invention.

What is claimed is:

1. A color filter substrate, comprising:
  a transparent substrate, wherein the transparent substrate has a display region and a peripheral region, and the peripheral region surrounds the display region;
  a patterned light-shielding layer disposed on the transparent substrate, wherein the patterned light-shielding layer comprises a first light-shielding pattern disposed on the display region and a second light-shielding pattern continuously covering the whole of the peripheral region, and the first light-shielding pattern defines a plurality of sub-pixel regions;
  a plurality of color filter units disposed on the display region, wherein each of the color filter units is disposed correspondingly to each of the sub-pixel regions and partially overlaps the first light-shielding pattern; and
  a plurality of dummy color filter units disposed on the peripheral region, wherein the second light-shielding pattern is disposed under the dummy color filter units, and spacing between two adjacent dummy color filter units is wider than spacing between two adjacent color filter units.

2. The color filter substrate of claim 1, wherein a ratio of the spacing between two adjacent dummy color filter units to the spacing between two adjacent color filter units is between 1.2 and 3.

3. The color filter substrate of claim 1, wherein at least some of the color filter units are disposed adjacent to the dummy color filter units around a border between the display region and the peripheral region, and spacing between the color filter unit and the adjacent dummy color filter unit around the border is wider than the spacing between the two adjacent color filter units on the display region.

4. The color filter substrate of claim 3, wherein a ratio of the spacing between the color filter unit and the adjacent dummy color filter unit around the border to the spacing between two adjacent color filter units on the display region is between 1.2 and 3.

5. The color filter substrate of claim 1, wherein an area of each of the dummy color filter units is smaller than an area of each of the color filter units.

6. The color filter substrate of claim 5, wherein a ratio of the area of the dummy color filter unit to the area of the color filter unit is between 0.2 and 0.8.

7. The color filter substrate of claim 1, wherein a thickness of each of the dummy color filter units is thinner than a thickness of each of the color filter units.

8. The color filter substrate of claim 1, further comprising an over-coating layer covering the transparent substrate, the patterned light-shielding layer, the color filter units, and the dummy color filter units, wherein the patterned light-shielding layer, the color filter units, and the dummy color filter units are disposed between the over-coating layer and the transparent substrate.

9. The color filter substrate of claim 8, further comprising an alignment layer disposed on the over-coating layer.

10. The color filter substrate of claim 1, wherein the color filter units includes color resists of different colors.

11. The color filter substrate of claim 1, wherein the second light-shielding pattern covers an edge area of the display region adjacent to the peripheral region.

\* \* \* \* \*